(12) United States Patent
Chang

(10) Patent No.: US 8,704,673 B2
(45) Date of Patent: Apr. 22, 2014

(54) CABLE STRUCTURE WITH INDICATING FUNCTION

(76) Inventor: Cheng-Chun Chang, New Taipei (TW)

(*) Notice: Subject to any disclaimer, the term of this patent is extended or adjusted under 35 U.S.C. 154(b) by 263 days.

(21) Appl. No.: 13/151,451

(22) Filed: Jun. 2, 2011

(65) Prior Publication Data

US 2012/0212349 A1 Aug. 23, 2012

(30) Foreign Application Priority Data

Feb. 17, 2011 (TW) .............................. 100105203 A

(51) Int. Cl.
*G08B 21/00* (2006.01)
*H02J 7/00* (2006.01)
*H01M 10/46* (2006.01)

(52) U.S. Cl.
USPC ........ 340/654; 340/636.2; 340/656; 320/114; 320/130

(58) Field of Classification Search
USPC ...................... 340/636.2, 641, 653, 654, 656;
320/107, 111, 113, 114, 115, 130, 132,
320/134; 600/316, 365
See application file for complete search history.

(56) References Cited

U.S. PATENT DOCUMENTS

| | | | |
|---|---|---|---|
| 6,753,671 B1* | 6/2004 | Harvey | 320/107 |
| 7,166,987 B2* | 1/2007 | Lee et al. | 320/114 |
| 7,859,222 B2* | 12/2010 | Woud | 320/115 |
| 8,084,995 B2* | 12/2011 | Wei | 320/130 |
| 8,550,997 B2* | 10/2013 | Talbot et al. | 600/365 |
| 2005/0280398 A1* | 12/2005 | Lee et al. | 320/134 |
| 2011/0204849 A1* | 8/2011 | Mukai et al. | 320/111 |
| 2011/0273839 A1* | 11/2011 | Villegas et al. | 361/679.41 |

* cited by examiner

*Primary Examiner* — Van T. Trieu
(74) *Attorney, Agent, or Firm* — Guice Patents PLLC

(57) ABSTRACT

The present invention relates to a cable structure with indicating function, which comprises a cable, a first connector plug and an indication unit. The first connector plug has a main body and a connection part, and coupled with one end of the cable; and the indication unit is fastened in the main body and installed with at least an indicating device coupled with a circuit board and having an indicating function on the main body, the circuit board is connected to a power circuit between the cable and the first connector plug through a wire, and through a detecting circuit of the circuit board performing a comparison operation, the indicating device is enabled to respectively display the indication of charging in progress and charging finished. As such, a user can directly observe the charging status of the hand-held device through the display of the indication unit without needs of actuating the screen of the hand-held device.

7 Claims, 4 Drawing Sheets

CABLE STRUCTURE WITH INDICATING FUNCTION

BACKGROUND OF THE INVENTION

1. Field of the Invention

The present invention relates to a cable structure, especially to a cable structure with indicating function.

2. Description of Related Art

With the development of technology, 3C electronic products are designed to be thinner and smaller and a trend of touch control is also raising; so the 3C electronic products, for example hand-held devices e.g. a tablet PC, intelligent mobile phone and media displayer, become necessary items in our live. In fact, take a tablet PC, e.g. the iPad, an intelligent mobile phone, e.g. the iPhone or a media displayer, e.g. the iPod for instances, the tablet PC, intelligent mobile phone and media displayer have their own chargers and transmission cables for processing operations of charging or data transferring to the mentioned hand-held devices.

The charging circuit in the mentioned touch control type hand-held devices is all built-in on a printed circuit board installed inside the device itself. So a user only needs to connect the connector socket of the hand-held device in the connector plug of a charger, the rechargeable battery in the hand-held device can be charged through the power transferring via a cable, and the status whether the rechargeable battery is fully charged is often defined by actuating the screen of the hand-held device, e.g. touching the screen or pressing a certain button for actuation, so as to observe the pattern designed for showing the charging status on the screen, for avoiding the waste of electric power, the screen is disabled after a preset time, so the user may have to repeatedly operate the mentioned actuation fashion for actuating the screen of the hand-held device for observing whether the rechargeable battery is fully charged, therefore the mentioned fashion may not be convenient for users.

In some hand-held devices, a charging indication lamp is installed on the device itself, but for protecting the hand-held device which is expensive, the hand-held device is often sleeved with a protection cover, the charging indication lamp is therefore shielded and the charging status can not be directly observed. Moreover, some power adapters in the commercial market are provided with a charging indication lamp, but the power adapter has to be inserted in a socket on a wall or a socket of an extended cable, i.e. the power adapter is fastened on the power supply end instead of the hand-held device end, so the charging indication lamp may be shielded by an object such as a table and the charging status can not be directly observed; moreover, observing the charging status of a hand-held device through an external power adapter is not the common behavior that most users get used to, so the indication function can not be fully provided.

The applicant of the present invention has realized that the connector plug of a cable of a conventional power adapter, which is connected a hand-held device, is not provided with an indication function, so the user has to repeatedly actuate the screen of the hand-held device for observing the charging indication pattern shown on the screen; the mentioned fashion is not convenient and shall be improved.

SUMMARY OF THE INVENTION

One primary object of the present invention is to provide a cable structure with indicating function, an indication unit is additionally installed at a proper location of a first connector which is connected to a hand-held device, so a user can directly observe the charging status of the hand-held device through the display of the indication unit without actuating the screen of the hand-held device.

For achieving the mentioned object, one solution provided by the present invention is to provide a cable structure with indicating function, which comprises:

a cable in which plural conductive wires are installed;

a first connector plug having a main body and a connection part, and coupled with one end of the cable; and an indication unit, fastened in the main body and installed with at least an indicating device coupled with a circuit board and having an indicating function on the main body, the circuit board is connected to a power circuit between the cable and the first connector plug through a wire, and through a detecting circuit of the circuit board performing a comparison operation, the indicating device is enabled to respectively display the indication of charging in progress and charging finished.

DETAILED DESCRIPTION OF THE PREFERRED EMBODIMENT

Figure 1:
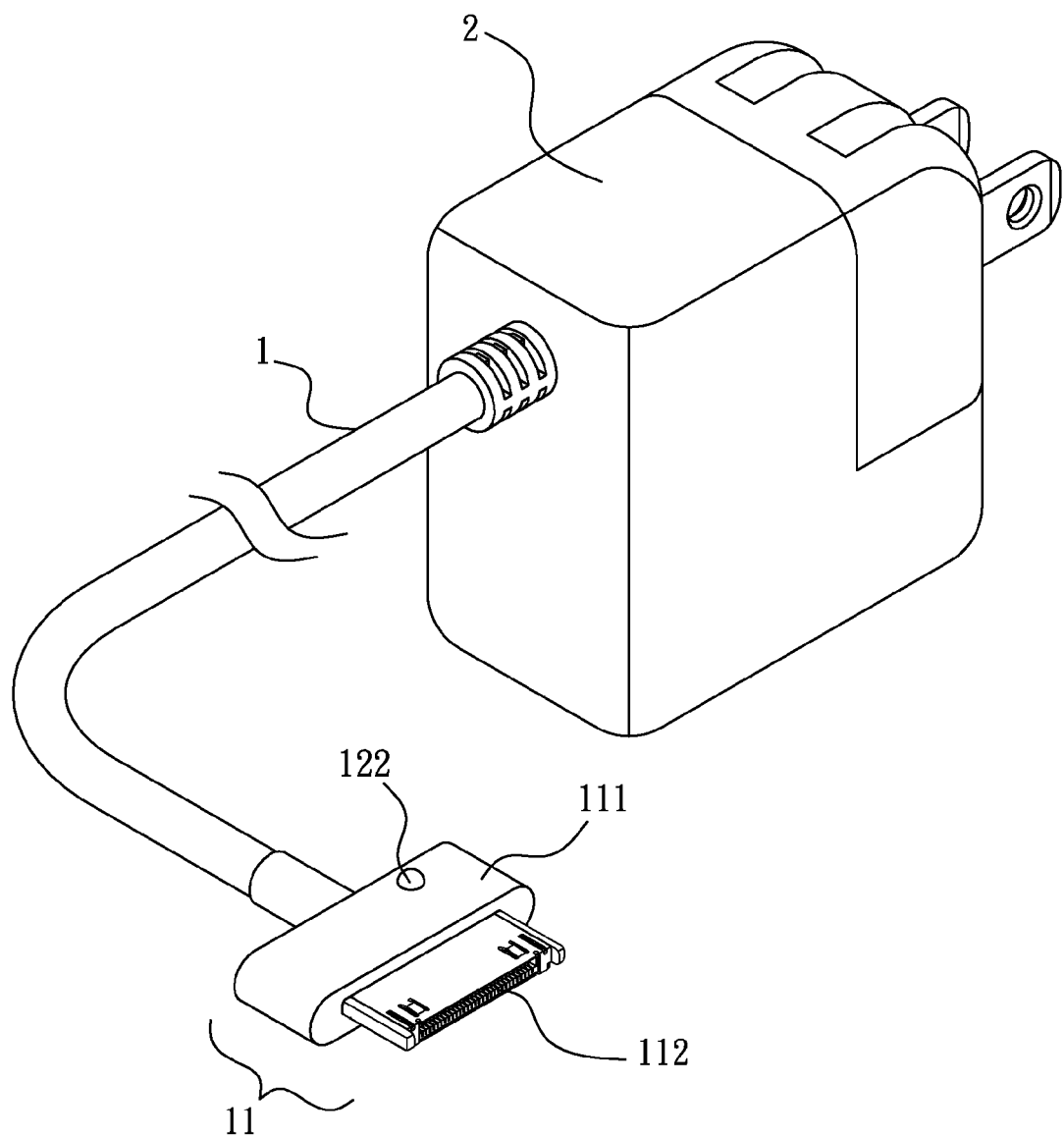
FIG. 1 is a perspective view illustrating the cable structure with indicating function according to the first embodiment of the present invention.
Figure 2:
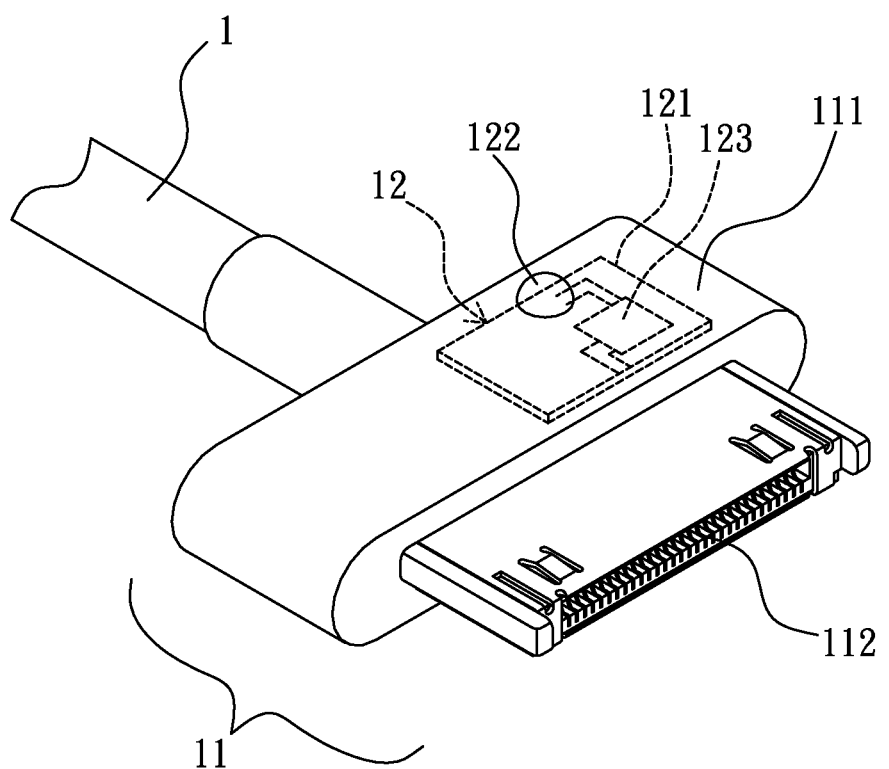
FIG. 2 is a partially enlarged view illustrating the first connector according to the present invention.
Figure 3:
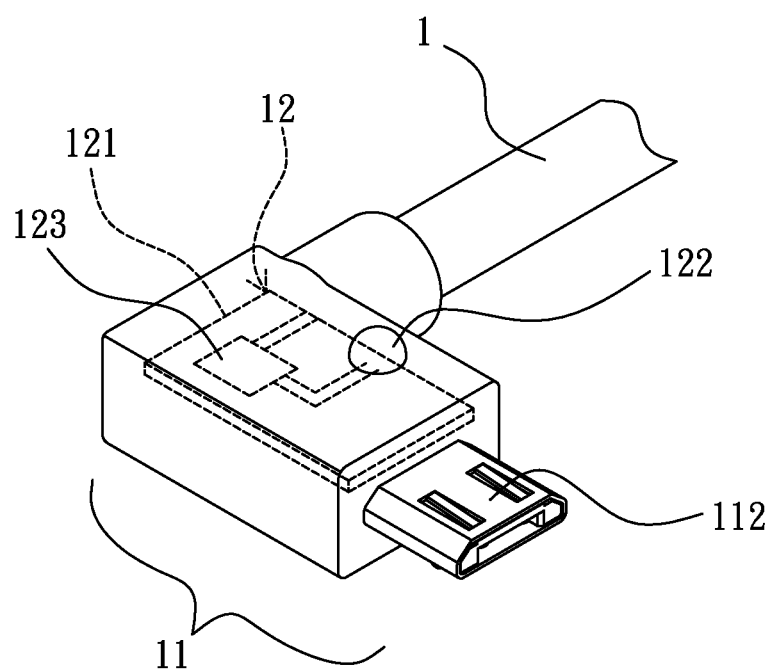
FIG. 3 is a partially enlarged view illustrating the first connector according to another embodiment of the present invention.
Figure 4:
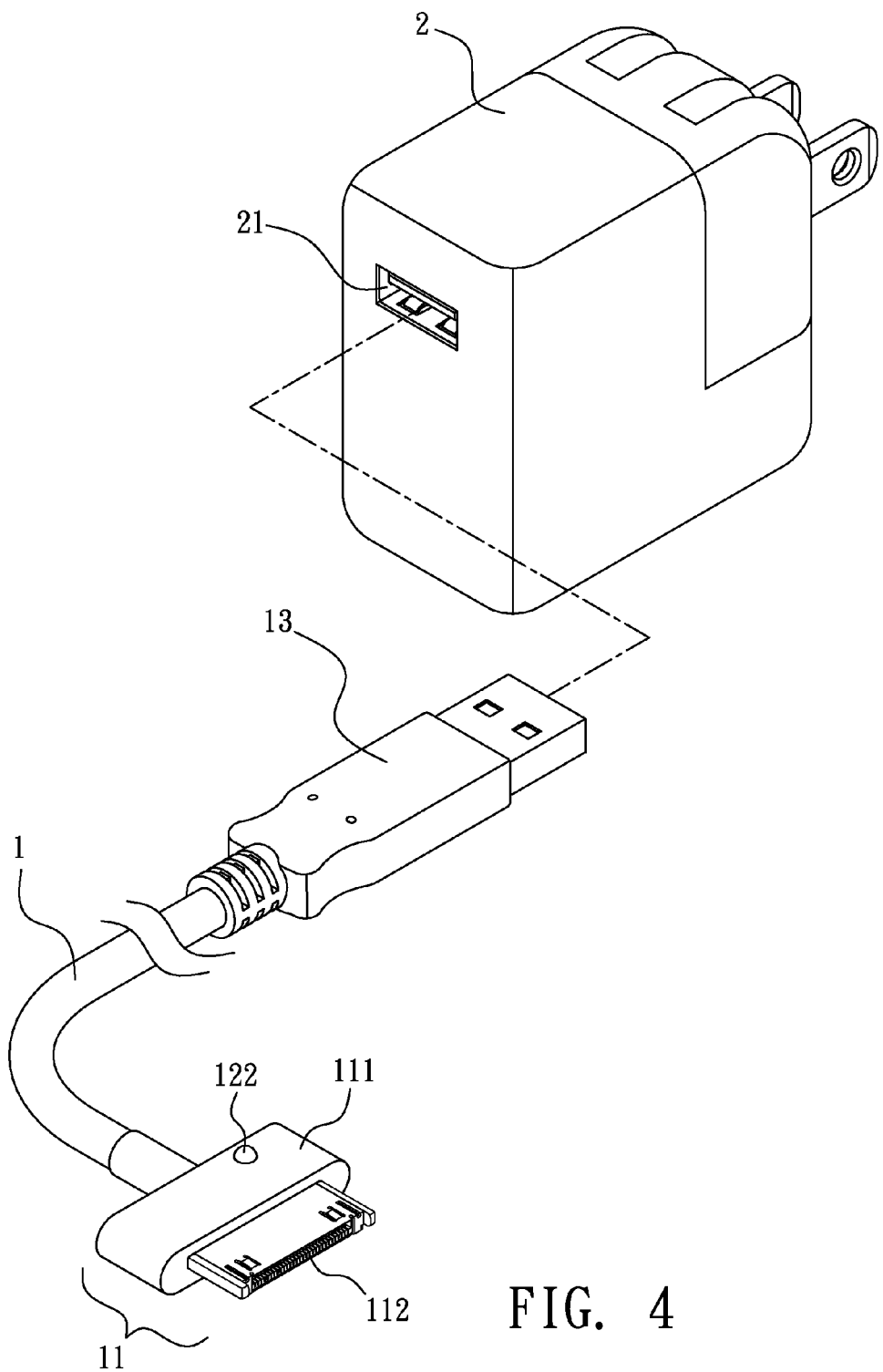
FIG. 4 is a perspective exploded view illustrating the cable structure according to the second embodiment of the present invention.

For further disclosing the substantial arts of the present invention, please firstly refer to figures, wherein FIG. 1 is a perspective view showing the cable structure with indicating function according to the first embodiment of the present invention; FIG. 2 is a partially enlarged view showing the first connector according to the present invention; FIG. 3 is a partially enlarged view showing the first connector according to another embodiment of the present invention; and FIG. 4 is a perspective exploded view showing the cable structure according to the second embodiment of the present invention.

As shown in FIG. 1 and FIG. 2, the cable structure with indicating function provided by the present invention comprises a cable 1 installed with plural conductive wires therein, one end thereof is coupled with a first connector plug 11 having a main body 111 and a connection part 112, the interface of the connection part 112 complies with the specification of a dock connector adopted in a hand-held device, e.g. a tablet PC (iPad), intelligent mobile phone (iPhone), media displayer (iPod) made by the Apple Inc. based in USA. The other end of the cable 1 is coupled with a power adapter 2, so after AC power being converted into DC power, the converted DC power is supplied to the hand-held device through the first connector plug 11 for charging the hand-held device, the method for charging a hand-held device with a charger is a conventional art so no further illustration is provided.

Referring to FIG. 2, the present invention is characterized in: an indication unit 12 is installed at a proper location of the first connector plug 11, e.g. the top surface of the main body 111, the indication unit 12 is embedded and fastened in the main body 111 with an injection means, the indication unit 12 has at least an indicating device 122 having an indicating function on the main body 111 and coupled with a circuit board 121. As shown in figures, the arrangement of the indicating device 122 being exposed on the top surface of the main body 111 is only an example of the present invention and not the limitation for the application of the present invention, the indicating device 122 can also be installed inside the main body 111, and only a transparent window is needed to be installed on the main body 111 at the location corresponding to the indicating device 122, thus the visual effect would not be affected. The circuit board 121 is connected to a power circuit between the cable 1 and the first connector plug 11 via a wire, and through a detecting circuit 123 of the circuit board 121 performing comparison of the voltage and current, the indicating device 122, e.g. an indication lamp, can respectively display the indications of charging in progress and charging finished with a fashion of flashing in two different flashing frequencies, e.g. bright and dark, or in two different colors.

As shown in FIG. 2, the indicating device 122 is an indication lamp and the quantity thereof is one, when the power is transferred through the cable 1 and forwardly passed the indicating device 122 from the detecting circuit 123 of the circuit board 121, the red color is displayed by the indicating device 122 for indicating that the cable 1 is charging the rechargeable battery in the hand-held device through the connection part 112 of the first connector plug 11; if the indicating device 122 displays green color, it means the rechargeable battery in the hand-held device has been fully charged, and the detecting circuit 123 of the circuit board 121 terminates the power supply of the connection part 112 but the indicating device 122 is still enabled to display the green color; at this moment the user can directly remove the hand-held device from the first connector plug 11 so as to operate the hand-held device.

Moreover, the indicating device 122 is not limited to the mentioned indication lamp, in actual use, a liquid crystal display can also be adopted which provides the same function.

Moreover, in actual use, the first connector plug 11 is not limited to the mentioned dock connector; as shown in FIG. 3, other formats of the first connector plug 11 can be a standard, mini or micro USB connector plug for supplying power or transferring data.

As shown in FIG. 4, which is a perspective exploded view showing the cable structure according to the second embodiment of the present invention. One end of the cable 1 is the first connector plug 11 and the other end thereof is a second connector plug 13. As mentioned above, in actual use, the first connector plug 11 is preferably to be a dock connector or USB connector, and the second connector plug 13 is preferably to be a USB connector. The second connector plug 13 can be directly inserted in a USB port of a computer so as to perform operations of charging or data transferring to the hand-held device, e.g. a synchronous process; or the second connector plug 13 can be directly inserted in a connector socket 21 preset on the power adapter 2 for charging the hand-held device. In fact, when the cable structure provided by the present invention processes data transferring with a computer, the detecting circuit 123 of the circuit board 121 enables the indicating device 122 to respectively display the indication of data transferring in progress or data transferring finished, due to the current passing through or changes of the voltage.

According to the present invention, an indication unit 12 is additionally installed on the first connector plug of the cable 1, so a user can easily observe the charging status of a hand-held device without needs of actuating the screen of the hand-held device, so the charging operation for the hand-held device is more convenient.

The advantage of the present invention is that: by additionally installing an indication unit on the first connector plug of the cable structure, the indication unit is disposed closer to the hand-held device, so a user can easily observe the charging status of a hand-held device without needs of actuating the screen of the hand-held device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A cable structure with indicating function, comprising:
a cable having a plurality of conductive wires located therein, a first connector plug located on a first end of the cable and connected to the plurality of conductive wires, and a USB connector located on a second end of the cable and connected to the plurality of conductive wires;
the first connector plug having a main body, a connection part, and an indication unit located in the main body thereof, the indication unit having a circuit board, at least one indicating device coupled with the circuit board and having an indicating function on said main body of the first connector plug, said circuit board being connected to a power circuit between said cable and said first connector plug through a wire, and through a detection circuit of said circuit board performing a comparison operation on a voltage or a current, said indicating device being enabled to respectively display an indication of charging in progress or charging finished based on the comparison operation when the cable is used in a charging process, and an indication of data transferring in progress or data transfer finished based on the comparison operation when the cable is used in a data transfer process.

2. The cable structure with indicating function as claimed in claim 1, wherein said first connector plug is a dock connector.

3. The cable structure with indicating function as claimed in claim 1, wherein said first connector plug is selected from a group consisting of a standard, mini and micro USB connector.

4. The cable structure with indicating function as claimed in claim 1, wherein said indicating device is selected from a group consisting of an indication lamp and a liquid crystal display.

5. The cable structure with indicating function as claimed in claim 1, wherein the USB connector is coupled with a power adapter.

6. The cable structure with indicating function as claimed in claim 1, wherein the USB connector is coupled with a second connector plug.

7. The cable structure with indicating function as claimed in claim 6, wherein said second connector plug is selected from a group consisting of a standard, mini and micro USB capable of being inserted in a connector socket of a computer or a power adapter.

\* \* \* \* \*